(12) United States Patent
Sperling et al.

(10) Patent No.: US 8,786,486 B1
(45) Date of Patent: Jul. 22, 2014

(54) SYSTEM AND METHOD FOR PROVIDING WEATHER RADAR STATUS

(75) Inventors: Steven Sperling, Cedar Rapids, IA (US); Daniel L. Woodell, Cedar Rapids, IA (US); Roy E. Robertson, Marion, IA (US); Nathanael A. Meyer, Coralville, IA (US); Gregory J. Koenigs, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 367 days.

(21) Appl. No.: 13/246,680

(22) Filed: Sep. 27, 2011

(51) Int. Cl.
*G01S 13/00* (2006.01)

(52) U.S. Cl.
USPC .................. 342/26 B; 342/26 R; 342/176

(58) Field of Classification Search
USPC ................. 342/26 B, 176, 182, 191
See application file for complete search history.

(56) References Cited

U.S. PATENT DOCUMENTS

| | | | |
|---|---|---|---|
| 3,197,768 A | 7/1965 | Lhermitte | |
| 3,720,949 A | 3/1973 | Richter | |
| 3,725,914 A | 4/1973 | Davidson et al. | |
| 3,896,382 A | 7/1975 | Magenheim | |
| 4,011,565 A | 3/1977 | Toman | |
| 4,346,595 A | 8/1982 | Frosch et al. | |
| 4,722,599 A | 2/1988 | Fruengel et al. | |
| 4,761,650 A | 8/1988 | Masuda et al. | |
| 4,835,536 A | 5/1989 | Piesinger et al. | |
| 5,077,558 A | 12/1991 | Kuntman | |
| 5,164,731 A | 11/1992 | Borden et al. | |
| 5,198,819 A * | 3/1993 | Susnjara | 342/26 B |
| 5,202,690 A | 4/1993 | Frederick | |
| 5,311,183 A | 5/1994 | Mathews et al. | |
| 5,351,045 A | 9/1994 | Cornman | |
| 5,805,100 A | 9/1998 | Becker et al. | |
| 5,839,080 A | 11/1998 | Muller et al. | |
| 5,945,926 A | 8/1999 | Ammar et al. | |
| 6,043,756 A | 3/2000 | Bateman et al. | |
| 6,201,494 B1 | 3/2001 | Kronfeld | |
| 6,252,539 B1 | 6/2001 | Phillips et al. | |
| 6,289,277 B1 | 9/2001 | Feyereisen et al. | |
| 6,317,690 B1 | 11/2001 | Gia | |
| 6,388,607 B1 | 5/2002 | Woodell | |
| 6,388,608 B1 | 5/2002 | Woodell et al. | |
| 6,421,603 B1 | 7/2002 | Pratt et al. | |
| 6,424,288 B1 * | 7/2002 | Woodell | 342/26 R |
| 6,456,226 B1 | 9/2002 | Zheng et al. | |
| 6,501,392 B2 | 12/2002 | Gremmert et al. | |
| 6,512,476 B1 | 1/2003 | Woodell | |
| 6,549,161 B1 | 4/2003 | Woodell | |
| 6,577,947 B1 | 6/2003 | Kronfeld et al. | |

(Continued)

OTHER PUBLICATIONS

U.S. Appl. No. 13/246,743, filed Sep. 27, 2011, Sishtla et al.

(Continued)

*Primary Examiner* — John B Sotomayor
*Assistant Examiner* — Marcus Windrich
(74) *Attorney, Agent, or Firm* — Donna P. Suchy; Daniel M. Barbieri

(57) ABSTRACT

Methods, systems, and computer-readable media relating to providing weather data generated by a weather radar system of an aircraft are provided. A method comprises transmitting scan status data indicating that a weather cell is currently being scanned by the weather radar system to a display device. The display device is configured to display an indication that the weather cell is currently being scanned after receiving the scan status data.

20 Claims, 11 Drawing Sheets

(56) References Cited

U.S. PATENT DOCUMENTS

| | | | |
|---|---|---|---|
| 6,597,305 B2 | 7/2003 | Szeto et al. | |
| 6,603,425 B1 | 8/2003 | Woodell | |
| 6,667,710 B2 * | 12/2003 | Cornell et al. | 342/26 R |
| 6,675,099 B2 | 1/2004 | Katsuhiro | |
| 6,690,317 B2 | 2/2004 | Szeto et al. | |
| 6,741,203 B1 | 5/2004 | Woodell | |
| 6,836,239 B2 | 12/2004 | Scott | |
| 6,879,280 B2 | 4/2005 | Bull et al. | |
| 6,882,302 B1 | 4/2005 | Woodell et al. | |
| 6,977,608 B1 * | 12/2005 | Anderson et al. | 342/26 B |
| 7,020,434 B2 * | 3/2006 | Legan | 434/2 |
| 7,042,387 B2 | 5/2006 | Ridenour et al. | |
| 7,109,912 B1 | 9/2006 | Paramore et al. | |
| 7,109,913 B1 * | 9/2006 | Paramore et al. | 342/26 B |
| 7,242,343 B1 | 7/2007 | Woodell | |
| 7,307,577 B1 | 12/2007 | Kronfeld et al. | |
| 7,417,579 B1 | 8/2008 | Woodell | |
| 7,541,970 B1 | 6/2009 | Godfrey et al. | |
| 7,567,199 B2 * | 7/2009 | Ridenour et al. | 342/26 B |
| 7,696,921 B1 | 4/2010 | Finley et al. | |
| 7,714,767 B1 | 5/2010 | Kronfeld et al. | |
| 7,817,078 B2 * | 10/2010 | Bunch | 342/26 B |
| 7,973,698 B1 | 7/2011 | Woodell et al. | |
| 7,982,658 B2 | 7/2011 | Kauffman et al. | |
| 8,059,024 B2 | 11/2011 | Christianson | |
| 8,068,038 B2 | 11/2011 | Engels et al. | |
| 8,111,186 B2 | 2/2012 | Bunch et al. | |
| 8,159,369 B1 | 4/2012 | Koenigs et al. | |
| 8,410,977 B2 | 4/2013 | Rowen et al. | |
| 2003/0016156 A1 | 1/2003 | Szeto et al. | |
| 2004/0239550 A1 | 12/2004 | Daly, Jr. | |
| 2010/0103029 A1 | 4/2010 | Khatwa et al. | |
| 2012/0050073 A1 * | 3/2012 | Bunch et al. | 340/971 |

OTHER PUBLICATIONS

Kuntman, D., Satellite Imagery: Predicting aviation weather hazards, ICAO Journal, vol. 55, Mar. 2000, 4 pps.
RDR-4B Honeywell User Manual for Forward Looking Windshear Detection/Weather Radar System, Rev. 6, Jul. 2003, 106 pps.
Collins WXR-2100 Multiscan™ Weather Radar brochure, 2000, 2 pages.
Multiscan™ Overview brochure, retrieved on May 17, 2006, 6 pages.
Rockwell Collins Multi Scan Radars Find Favor with Asia-Pacific Carriers, http://www.avweek.com/shownews/02asia1/avion06b.htm, retrieved on May 17, 2006, 2 pages.
Rockwell Collins WXR-2100 Weather Radar System, http://www.rockwellcollins.com/ecat/at/WXR-2100_PrintFriendly.html, retrieved on May 17, 2006, 9 pages.

* cited by examiner

SYSTEM AND METHOD FOR PROVIDING WEATHER RADAR STATUS

CROSS-REFERENCE TO RELATED PATENT APPLICATIONS

The present application is related to U.S. patent application Ser. No. 13/246,743, titled "System and Method for Enabling Display of Textual Weather Information on an Aviation Display," which is being filed concurrently with the present application and is incorporated by reference herein in its entirety.

BACKGROUND

The present disclosure relates generally to the field of weather radar systems. More particularly, the present disclosure relates to providing an indication of the status of the weather radar system on a display device.

Pilots use weather radar systems to detect and avoid hazardous weather. The radar return signals are processed to provide graphical images to a radar display, for example, a display located in the cockpit of the aircraft. The radar display may be a color multi-function display (MFD) unit that provides color graphical images to represent the severity and location of weather. Some aircraft weather radar systems are also capable of other types of hazard detection, such as turbulence detection and/or windshear detection. These types of weather radar systems can also provide indications of the presence and/or location of turbulence or other hazards.

Weather radar systems often are not connected to a synchronous display. When using a display that is not synchronous, users (e.g., pilots) may have difficulty determining real-time latency and responsiveness of the system to weather events.

Conventional radar systems do not provide information about the operational state of the system, which can lead to a misinterpretation of information provided by the weather radar system. Conventional weather radar systems can malfunction and become frozen in a particular operation or on a particular display screen. During such as malfunction, users may be unsure whether the weather hazard assessments are actually taking place or whether the system is malfunctioning (e.g., if the weather radar system or display is frozen in a particular operation or on a particular display screen). Additionally, users may be unaware of when a scanning operation for a particular weather cell has been completed and/or what, if any, displayed weather cells have been scanned by the weather radar system. Thus, there is a need for a system that provides weather radar system status information to users so that the users have greater awareness of the operation of the weather radar system. Further, there is a need for a weather radar system that allows a pilot to judge latency or responsiveness of the system to weather events when used with a synchronous display. Further still, there is a need for a weather radar system that provides a pilot with an indication that an operation is being performed by the weather radar system (e.g., an advanced or non-standard scanning operation) and reassures the pilot that the system has not malfunctioned.

SUMMARY

One embodiment of the disclosure relates to a method of providing weather data generated by a weather radar system of an aircraft. The method comprises providing scan status data indicating that a weather cell is currently being scanned by the weather radar system to a display device. The display device is configured to display an indication that the weather cell is currently being scanned after receiving the scan status data.

Another embodiment relates to a system comprising a processing circuit configured to provide scan status data or a scan status signal indicating that a weather cell is currently being scanned by the weather radar system to a display device. The display device is configured to display an indication that the weather cell is currently being scanned after receiving the scan status data or the scan status signal.

Another embodiment relates to a computer-readable medium having instructions stored thereon. The instructions are executable by a processor to implement a method comprising transmitting first scan status data indicating that a weather cell is currently being scanned by the weather radar system to a display device. The display device is configured to display a first indication that the weather cell is currently being scanned after receiving the first scan status data. The method further comprises transmitting second scan status data after the weather radar system has finished scanning the weather cell. The display device is configured to display a second indication that the scan of the weather cell has been completed after receiving the second scan status data.

BRIEF DESCRIPTION OF THE DRAWINGS

FIGS. 4-7A are schematic plan view illustrations of displays of weather radar data according to exemplary embodiments.

DETAILED DESCRIPTION

Referring generally to the Figures, systems and methods are provided that may be used to convey weather radar system status information to a user (e.g., a pilot). A processing circuit may be configured to receive a selection of one or more weather cells to track and may be configured to scan the selected weather radar cells using a weather radar system. In some embodiments, the weather cells may be selected manually by a user (e.g., by selecting the weather cells on a display device using a user input device). In other embodiments, the processing circuit may be configured to automatically determine which cells to track based on predetermined parameters.

In one embodiment, the processing circuit may be configured to determine when the weather radar system is scanning a particular weather cell and provide a status indication to a display device. For example, the processing circuit may receive data from the weather radar system indicating that the weather radar system is currently scanning a first cell. After receiving the data from the weather radar system, the processing circuit may be configured to transmit data to the display device indicating to the user that the first cell is currently being scanned. Once the weather radar system has completed the scan of the first cell, the processing circuit may be configured to transmit data to the display device indicating that the scan has been completed. In some embodiments, the display device may be configured to display different indicators or icons for different weather cells based on whether the weather cells have been selected for scanning, are currently being scanned, scanning has been completed, scan data is no longer current, etc. In various embodiments, the systems and methods disclosed herein may provide a user with indications regarding the latency and responsiveness of the hazard assessments performed on the weather cells, which radar cells are being tracked at any particular point in time, when the radar has completed its assessment of particular weather cells, whether the radar is actually performing assessments (e.g., as opposed to sitting idle or malfunctioning), whether radar data is current or old, etc.

Figure 1:
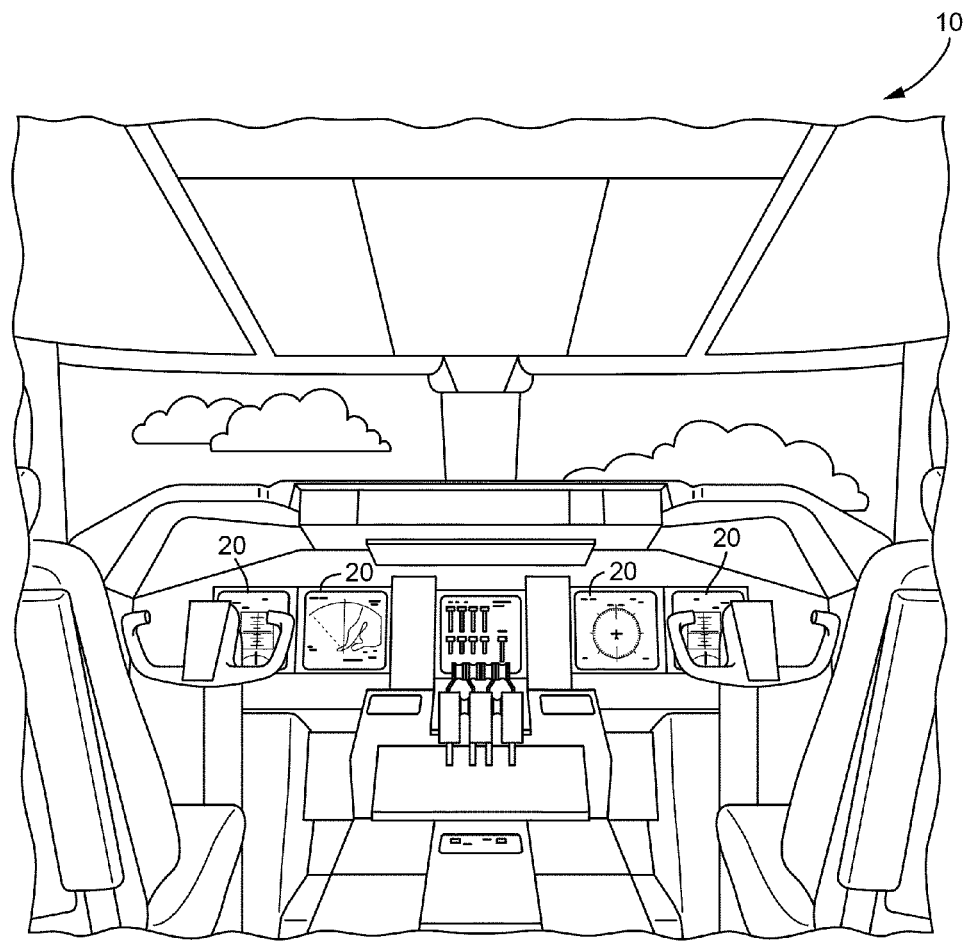
FIG. 1 is a schematic illustration of an aircraft control center according to an exemplary embodiment.

Referring now to FIG. 1, an illustration of an aircraft control center or cockpit 10 is shown according to an exemplary embodiment. Aircraft control center 10 includes flight displays 20 which are generally used to increase visual range and to enhance decision-making abilities. In an exemplary embodiment, flight displays 20 may provide an output from a radar system of the aircraft. For example, flight displays 20 may provide a top-down view, a horizontal view, a vertical profile view, or any other view of weather and/or terrain detected by a radar system on the aircraft. The views of weather and/or terrain may include monochrome or color graphical representations of the weather and/or the terrain. Graphical representations of weather or terrain may include an indication of altitude of those objects or the altitude relative to the aircraft. Aircraft control center 10 may further include terrain awareness and warning system (TAWS) user interface elements (flashing lights, displays, display elements on a weather radar display, display elements on a terrain display, audio alerting devices, etc.) configured to warn the pilot of potentially threatening terrain features. The TAWS system may be configured to, for example, give the pilots of the aircraft a "pull up" indication (e.g., audibly, visually, etc.) when terrain is detected within an altitude of danger to the aircraft.

Figure 2:
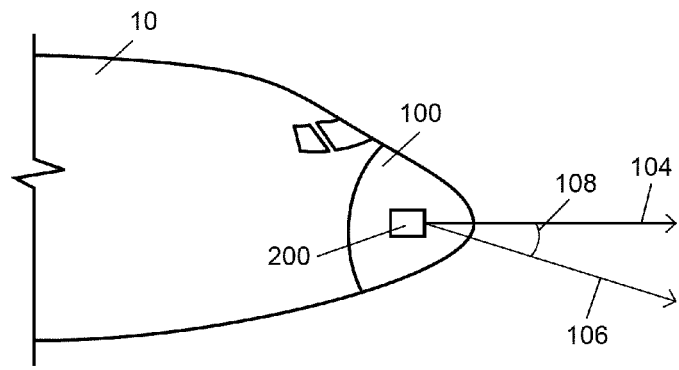
FIG. 2 is a schematic sideview illustration of a portion of an aircraft including a weather radar system according to an exemplary embodiment.

In FIG. 2, the front of an aircraft is shown with aircraft control center 10 and nose 100 according to an exemplary embodiment. A radar system 200 (e.g., a weather radar system or other radar system) is generally located within nose 100 of the aircraft or within aircraft control center 10 of the aircraft. According to various exemplary embodiments, radar system 200 may be located on the top of the aircraft or on the tail of the aircraft instead. Radar system 200 may include or be coupled to an antenna system. A variety of different antennas or radar systems may be used with the present invention (e.g., a split aperture antenna, a monopulse antenna, a sequential lobbing antenna, etc.).

Radar system 200 generally works by sweeping a radar beam horizontally back and forth across the sky at one or more tilt angles. Some radar systems conduct a first horizontal sweep 104 directly in front of the aircraft and a second horizontal sweep 106 downward at some tilt angle 108 (e.g., 20 degrees down). Returns from different tilt angles can be electronically merged to form a composite image for display on an electronic display, such as a flight display 20 in aircraft control center 10. Returns can also be processed to, for example, distinguish between terrain and weather, to determine the height of terrain, or to determine the height of weather. In one embodiment, radar system 200 may be a WXR-2100 MultiScan™ radar system or similar system manufactured by Rockwell Collins. According to other embodiments, radar system 200 may be an RDR-4000 system, an IntuVue™ 3-D radar system, or similar system manufactured by Honeywell International, Inc.

Radar system 200 may also sweep a radar beam vertically back and forth. Results from the different vertical tilt angles may be analyzed to determine the characteristics of weather. For example, the altitude, range, and vertical height of the weather may be determined using the vertical scan results. These results may be used to form an image for display on an electronic display (e.g., flight display 20, etc.). For example, a vertical profile view of the weather may be generated. Such a profile may be used by a pilot to determine height, range, and other relevant information that can be utilized by the pilot to change the course of the aircraft to avoid the detected weather.

Further information regarding weather radar systems that may be used in conjunction with the systems and methods disclosed herein, according to various exemplary embodiments, may be found in U.S. Pat. No. 7,242,343, filed Sep. 15, 2004, and U.S. Pat. No. 6,577,947, filed Mar. 1, 2002, both of which are assigned to the assignee of the present application and are incorporated by reference herein in their entireties.

Figure 3:
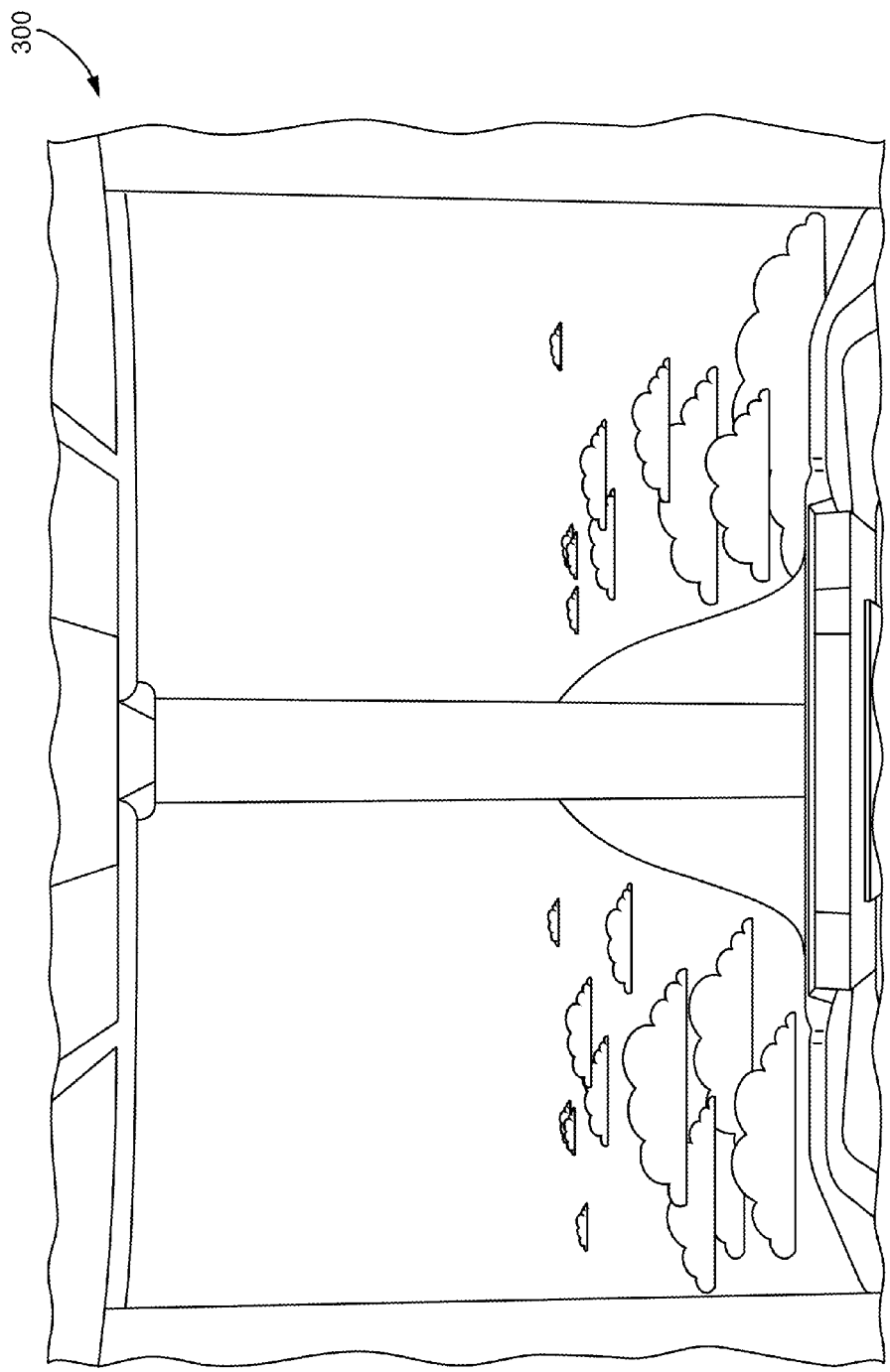
FIG. 3 is a schematic illustration of an environment visible through the front windshield of an aircraft according to an exemplary embodiment.

Referring now to FIG. 3, an illustration of an environment 300 visible through the front windshield of an aircraft (e.g., a pilot's view when looking out of cockpit 10) is shown according to an exemplary embodiment. Environment 300 may include portions of airspace in which no substantial weather hazards are present and portions of airspace where weather hazards may be present (e.g., clouded areas). However, it is difficult for a pilot to determine whether actual weather hazards exist, and what the severity of those hazards may be, merely by looking at the environment out of the windshield.

Figure 4:
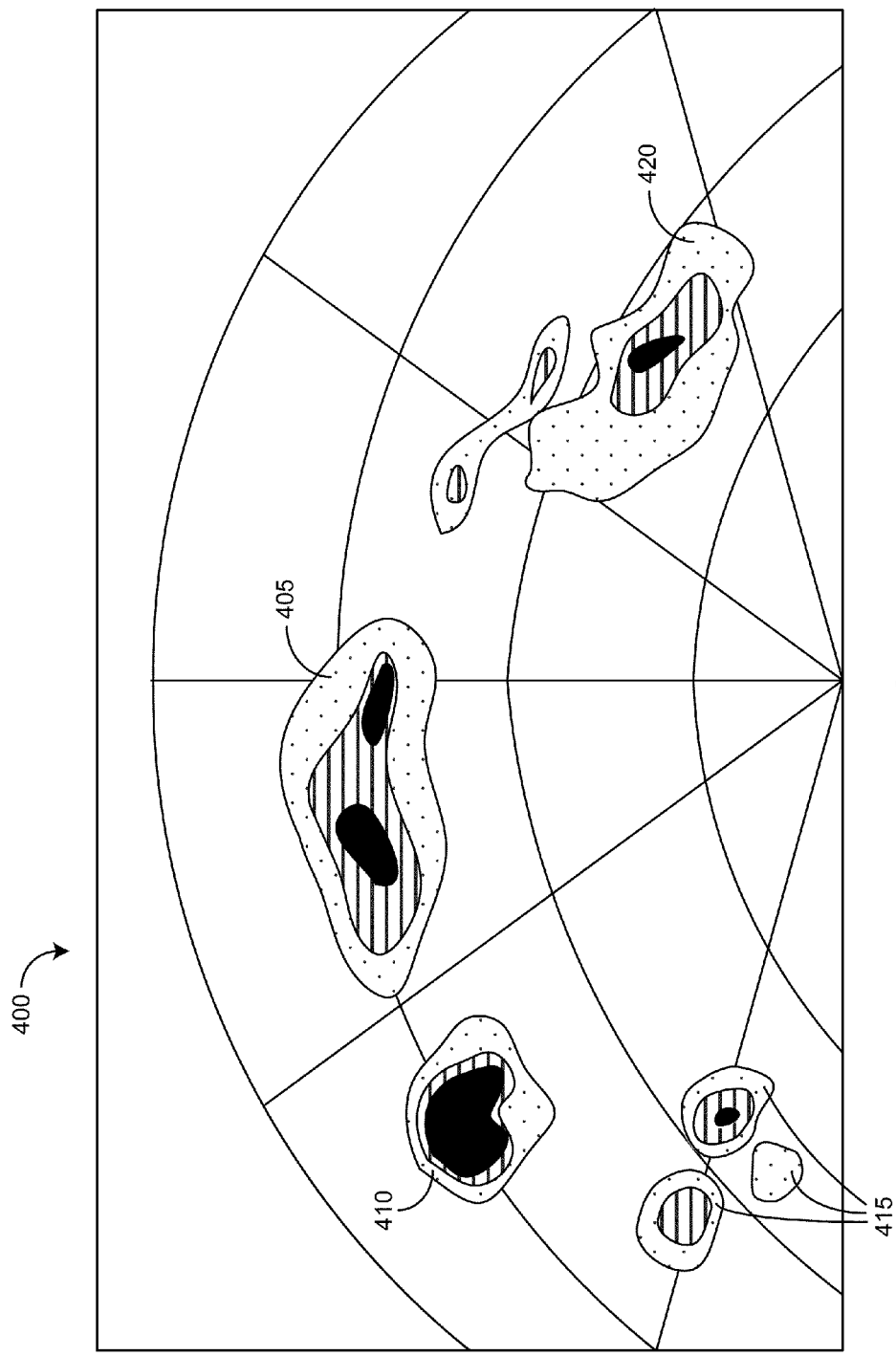

Aircraft may be equipped with weather radar systems to provide further information about potential weather hazards. Referring now to FIGS. 4-7, plan view displays of weather radar data are shown according to exemplary embodiments. Referring specifically to FIG. 4, a plan view display image 400 is shown illustrating various weather cells that are in the vicinity of an aircraft. Display image 400 provides a pilot with information about the range and bearing from the aircraft to weather cells in proximity to the aircraft. Several weather cells are shown in display image 400 as being proximate to the aircraft, including weather cells 405, 410, 415, and 420.

The data shown in display image 400 may be generated using a standard scan pattern of a weather radar system (e.g., horizontal sweeps across the environment in front of and/or to the sides of the aircraft). Display image 400 may be provided to a pilot via a display device (e.g., using an ARINC 453 or ARINC 661 bus) and may be based on radar-generated reflectivity data (e.g., measured in decibels or dBZ). Display image 400 may be shown when the radar is not tracking any particular cells in detail.

In some circumstances, the pilot may also wish to learn more detailed information about potential weather hazards in proximity to the aircraft. The weather radar system may be configured to perform detailed analysis of one or more identified weather cells or portions of weather cells to determine further information regarding the hazard posed by the cells. For example, advanced analysis may be performed by the weather radar system to determine a cell-top altitude (e.g., a highest altitude for the cell) and/or threats contained in the cell, such as lightning, hail, turbulence, etc. In some embodiments, the weather radar system may be configured to conduct the advanced analysis by performing vertical radar sweeps (e.g., sweeping a range of altitudes above and/or below a current altitude of the aircraft) near identified range and bearing targets and/or across a target bearing. In some embodiments, advanced sweeps of certain cells and standard (e.g., horizontal) sweeps may be performed in a mixed fashion, for example, such that one or more standard sweeps are performed, then one or more advanced tracking scans are performed, then a standard sweep is performed again, etc. Performing advanced analysis of certain cells while also performing standard radar scanning may be referred to as a track while scan operation.

When the weather radar system is performing advanced analysis on a particular weather cell, it usually temporarily stops scanning in its standard (e.g., horizontal) pattern to perform the advanced analysis. Standard radar display systems may not display an indication that the weather radar system has broken out of its normal scanning pattern to perform advanced analysis. In some embodiments, radar display systems may simply freeze the current radar display until a new standard radar scan can be performed to update the displayed image. This can be disconcerting to the pilot; the pilot may be unsure whether the radar is performing an advanced scan of a particular weather cell or the radar has malfunctioned. Additionally, without providing further information to the pilot, the pilot does not know which cell is currently being tracked, which cells have already been tracked, which cells have not been tracked, etc.

To further inform the pilot as to the operation of the weather radar system, one or more status indications or icons may be provided in the display image. A generated display image may be based on cell track data and status information extracted from the radar flight data to display the number and state of weather cells being scanned or tracked by the weather radar. The display application may annunciate each cell's position and scan status as determined by the radar. The status indicators or icons may be superimposed on the normal weather radar display data and may be provided in different (e.g., contrasting) colors, patterns, or symbology than the normal weather display data. Additionally, different icons may be shown in different colors, patterns, symbology, etc. to indicate different radar status data, as discussed in further detail below. In some embodiments, instead of or in addition to providing indicators, the weather cell may be changed to indicate different states, such as by brightening cells being scanned and darkening cells where scanning is not active, circling an entire active cell on the display, etc. The indicators may be provided at a position proximate to the weather cell with which it is associated to enable the pilot to determine which weather cell is being tracked. In another embodiment, indicators may be associated with weather cell identifiers (e.g., alphanumerical, color, etc.) representing the cells with which they are related. The persistence of the indicators may be directly tied to the radar system's internal cell state tracking logic.

In some embodiments, the display system may be tailored to the capability of each cockpit type or aircraft. An icon or outline may be produced in a normal radar output display bus (e.g., ARINC 453, ARINC 661, etc.), and a visual annunciation may be triggered for displays that contain the assessment activity. Later display sweeps may return to the normal display to cue the pilot that the assessments are not current.

One type of status indicator (e.g., a tracking indicator) may be used to indicate that a cell is being tracked by the weather radar system. A tracking indicator may indicate to the pilot that the weather radar system has identified the cell (e.g., using a normal horizontal scanning procedure) and that the cell is being monitored (e.g., along with other cells in the proximity of the aircraft) by the weather radar system. In some embodiments, the cells indicated by the tracking indicator may form the set of identified cells for which advanced scanning operations may be performed by the radar system.

Another status indicator (e.g., a currently scanning indicator) may be used to indicate a cell that is currently being scanned by the weather radar system. The scanning operation may include a vertical scan of a particular cell or portion of a cell, a special type of horizontal scan (e.g., a mini-horizontal scan) that may differ from a full standard horizontal scan, or another type of scanning operation (e.g., auxiliary scanning operation, such as a vertical scan). This currently scanning indicator may help assure the pilot that the weather radar system is actually tracking or performing advanced analysis on a particular weather cell and is not malfunctioning, despite the fact that the objects shown in display image 500 may not substantially change while the weather cell is being tracked. In some embodiments, the currently scanning indicator (and/or other indicators described herein) may be configured to move (e.g., via animation), change colors, blink, etc. to further assure the pilot that activity is being performed by the weather radar system.

Another indicator (e.g., a scan completed indicator) may be used to indicate that a cell has previously been tracked, or that a tracking or detailed scanning operation on a particular cell has been completed. The scan completed indicator may indicate to the pilot that advanced weather hazard data (e.g., cell-top altitude, presence of threats such as lightning, hail, turbulence, etc.) is available for the particular cell. In some embodiments, the display may be configured to display the advanced weather hazard data (e.g., automatically upon completion of the tracking scan, based on user input such as moving a cursor over the cell or the scan completed indicator, etc.).

In some circumstances, weather conditions may change rapidly and weather hazard data for a cell collected by the radar may become out of date or expired after a certain amount of time (e.g., 30 seconds, 1 minute, 5 minutes, 10 minutes, 20 minutes, etc.). In some embodiments, an indication may be provided on the display after a predetermined amount of time has elapsed since the scan of a weather cell has been completed to indicate that the weather data is no longer current. In some embodiments, an indicator (e.g., a scan expired indicator) may be provided indicating that the cell has been scanned but that the data may no longer be particularly relevant. In other embodiments, the radar display system may be configured to remove the second indicator (e.g., indicating that the cell has been scanned) from the display image (e.g., such that it appears to the pilot as if the weather cell has not been scanned). In various embodiments, the predetermined amount of time may be a static value stored in a memory (e.g., 30 seconds, 1 minute, 5 minutes, 10 minutes, 20 minutes, etc.) and/or may be determined or altered dynamically based on the weather data for the cell received from the weather radar system.

Yet another indicator (e.g., a cell selected indicator) may be used to indicate that a cell has been selected to be tracked, but that the weather radar system has not yet tracked the cell. The weather radar system may be configured to automatically select one or more cells to be tracked from among a plurality of cells in the proximity of the aircraft, for example, based on proximity (e.g., range data) and/or direction (e.g., bearing data) of the cell to the aircraft, area covered by the cell (e.g., latitude and longitude boundaries), and/or other factors upon which hazard assessment algorithms may be based. The radar system may additionally or alternatively be configured to receive a selection of one or more cells to be tracked from the pilot via a user input device (e.g., cursor control device, bezel keys, touchscreen display, etc.) that may be used by the pilot to select the cells as illustrated in the display image. The cell selected indicator may be useful in providing an indication to the pilot of what cells have already been selected for tracking by the weather radar system (e.g., automatically or manually) so the pilot does not repeatedly re-select cells that have already been selected.

In some embodiments, a different indicator may be used for the cell selected indicator depending on whether the cell was automatically selected by the radar system or manually selected by the pilot. This may enable the user to determine when certain cells have been automatically selected for which the pilot may not be interested in obtaining further information. In some embodiments, an option may be provided to the pilot to cancel the scan of one or more cells (e.g., either manually or automatically selected). Using this option, the pilot may avoid wasting scan cycles on cells that were automatically selected but for which the pilot is not interested in receiving further information and/or cells that the pilot previously manually selected and later changed his mind. In some embodiments, the cell selected indicator for a cell (e.g., whether manually or automatically selected for tracking) may change states (e.g., to the first indictor or a different indicator) once the weather radar system begins scanning the cell.

Figure 5:
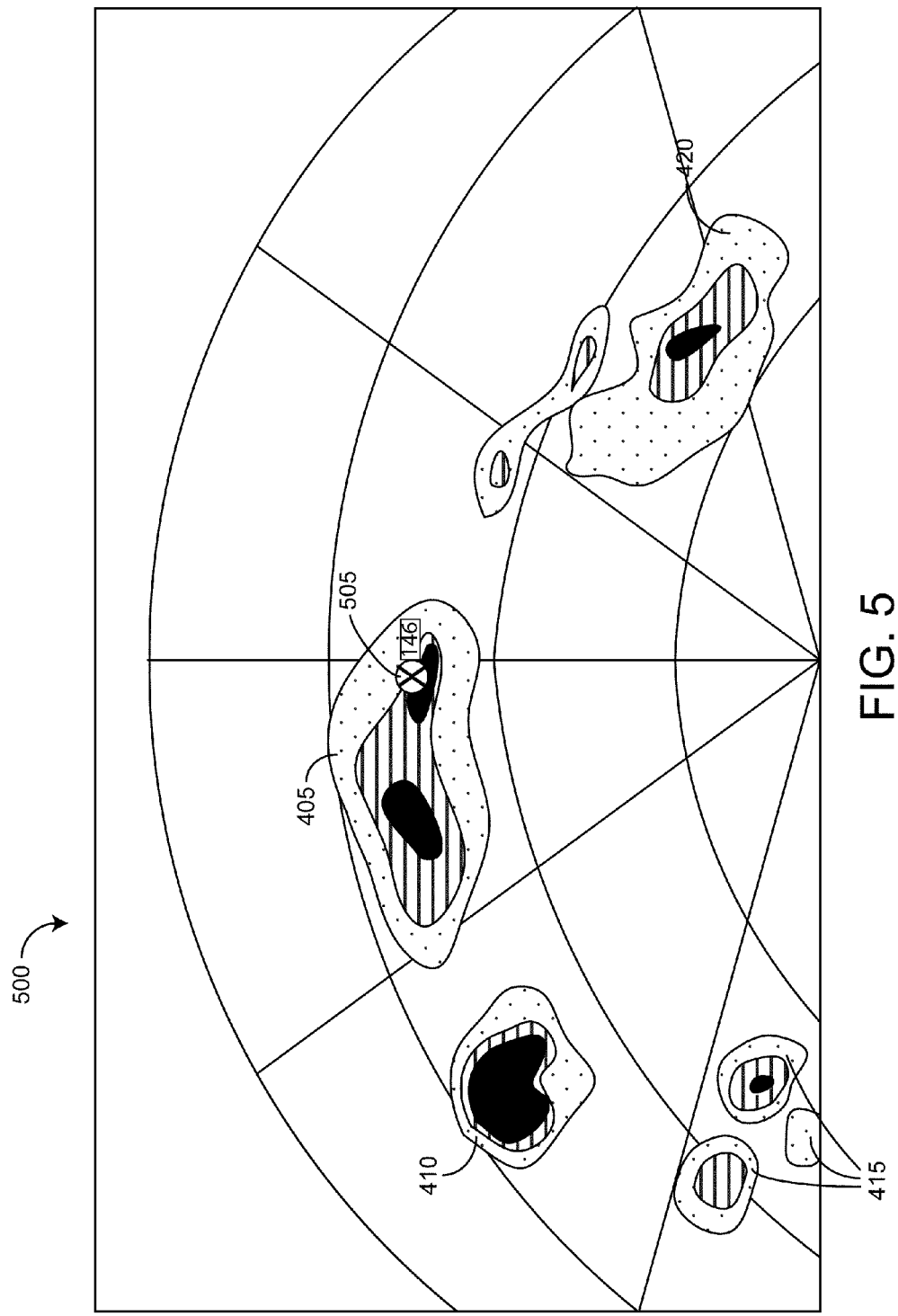

Exemplary embodiments illustrating possible implementations of various indicators described herein are now provided with reference to FIGS. 5-7A. FIGS. 5-7A represent possible plan view radar display images that may be provided on a display device as an aircraft is flown in the proximity of a plurality of weather cells. Referring now specifically to FIG. 5, another plan view display image 500 illustrating radar data for the same weather cells shown in display image 400 is shown according to an exemplary embodiment. Display image 500 includes an icon 505, shown as a circle containing and "X" in display image 500, associated with weather cell 405. Icon 505 indicates that a portion of weather cell 405 is currently being scanned by the weather radar system. In some embodiments, each of the weather cells that are being scanned, have been scanned, are selected to be scanned, etc. may be identified by a unique identifier, such as a number, letter, color, etc. For example, display image 500 includes the numeric indicator "146" next to icon 505.

Figure 6:
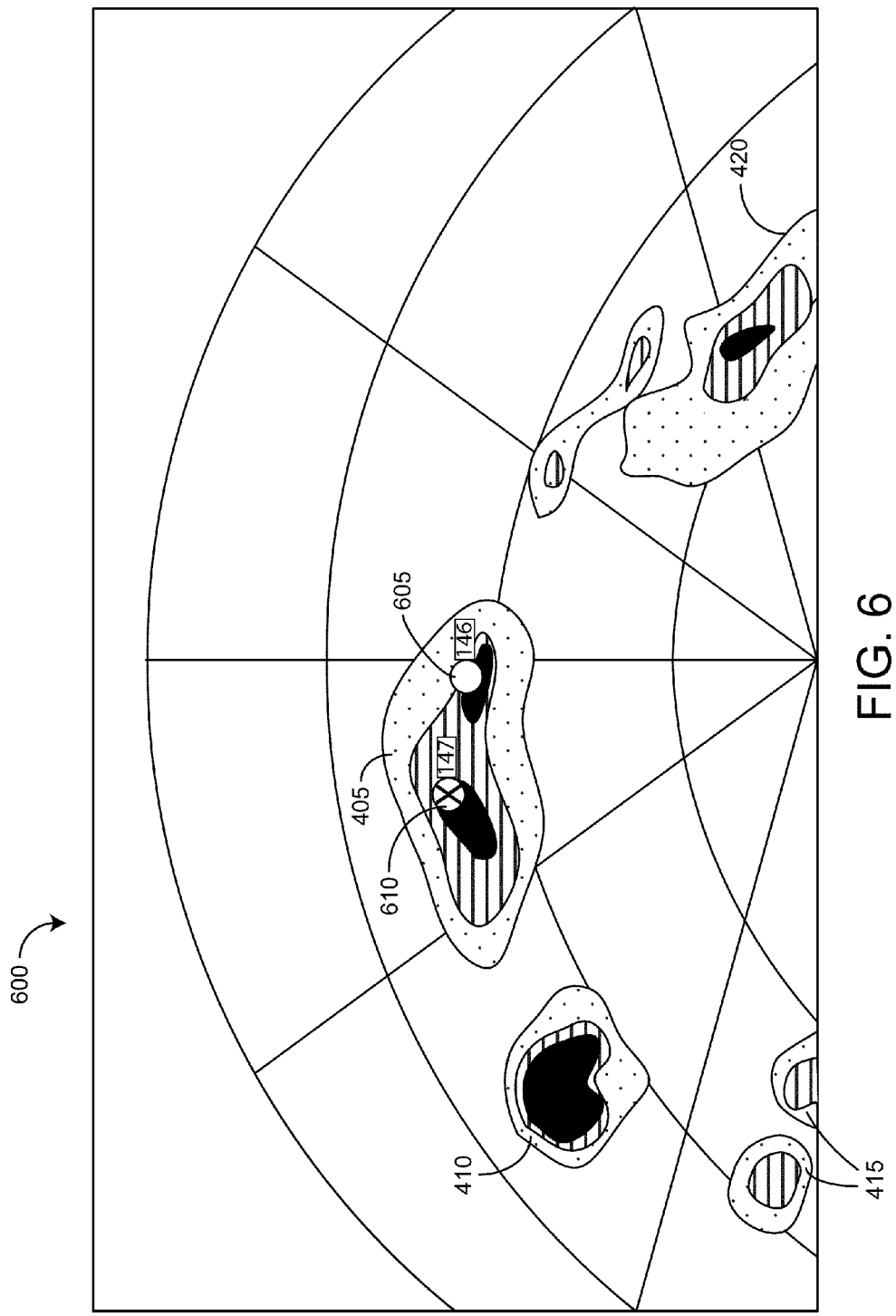

FIG. 6 illustrates another plan view display image 600 that may be displayed some time after display image 500 according to an exemplary embodiment. Display image 600 includes an icon 610 on a second portion of weather cell 405. Icon 610 is the same type of icon as icon 505 (e.g., a circle containing an "X") and indicates that the second portion of weather cell 405 is currently being scanned by the weather radar. Display image 600 also includes an icon 605 at the same position (e.g., same position with respect to weather cell 405) at which icon 505 was displayed in display image 500. Icon 605 is a different type of icon than icons 505 and 610 (e.g., a blank circle, or circle that does not contain an "X"). Icon 605 indicates that the first portion of weather cell 405 was previously scanned by the weather radar system and that the scan is now complete.

Figure 7A:
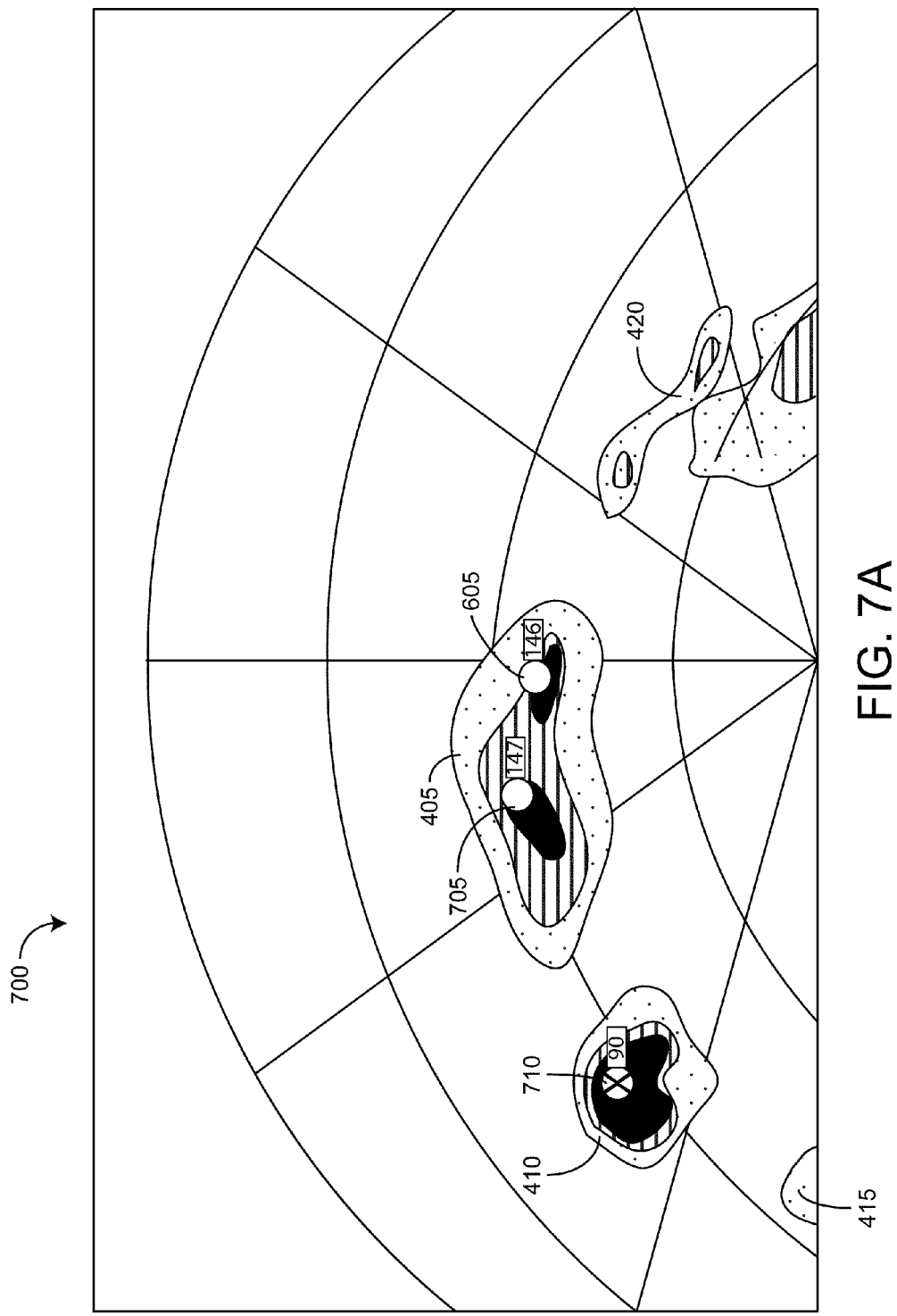

FIG. 7A illustrates yet another plan view display image 700 that may be displayed some time after display image 600 according to an exemplary embodiment. Display image 700 includes an icon 710 superimposed over weather cell 410. Icon 710 is of the same type as icons 505 and 610 and indicates to the pilot that weather cell 410 is being actively scanned by the weather radar system. Icon 605 is displayed at the same position (e.g., with respect to cell 405) as in display image 600 and continues to indicate to the pilot that the first portion of weather cell 405 was previously scanned (e.g., recently). Icon 705 is positioned in the same position as icon 610 in display image 600, but icon 705 now has the same type as icon 605, indicating that scanning of the second portion of weather cell 405 has been completed and weather cell 405 is no longer being actively scanned.

Figure 7B:
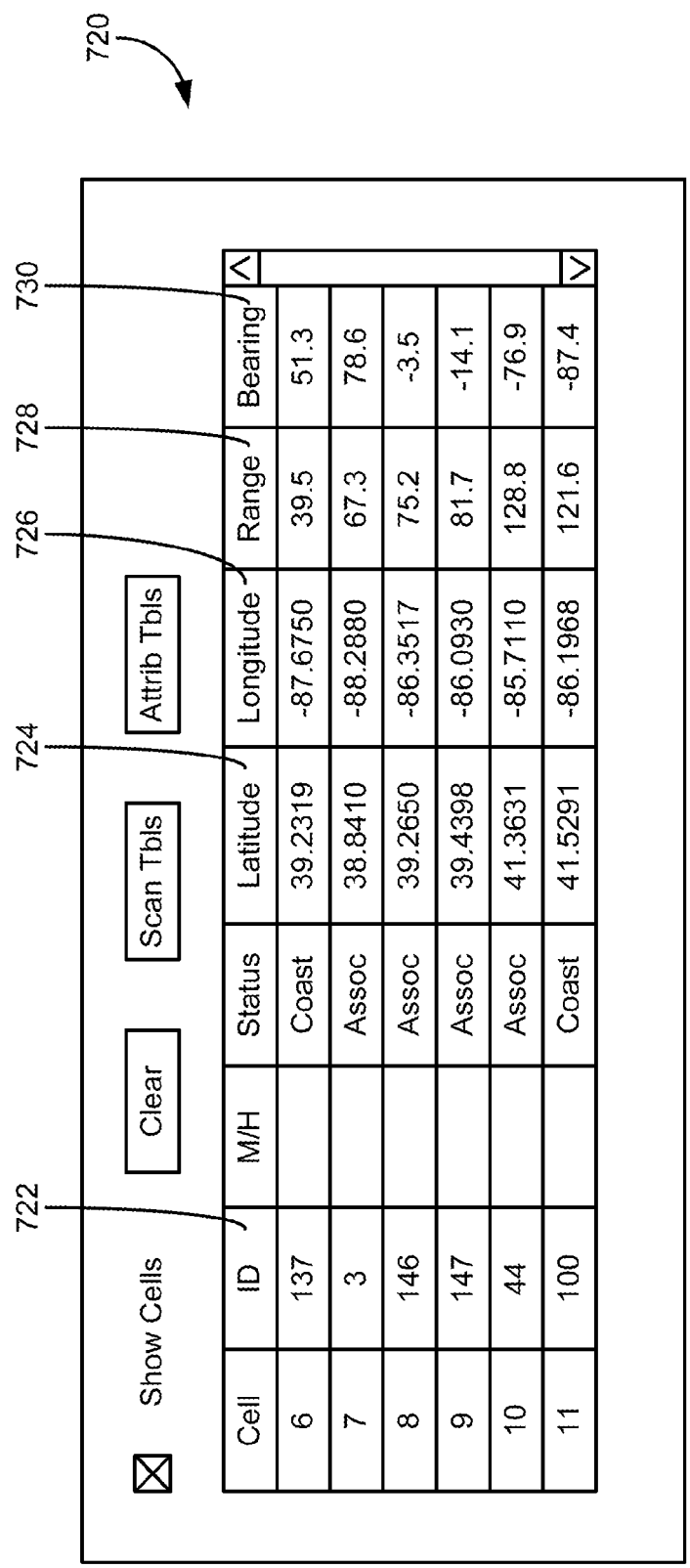
FIG. 7B is a schematic illustration of a display image that may be used to provide information regarding various weather cells according to an exemplary embodiment.

Referring now to FIG. 7B, a schematic illustration of a display image 720 that may be used to provide information regarding various weather cells is shown according to an exemplary embodiment. Image 720 includes a table identifying one or more weather cells that have been scanned by the weather radar system (e.g., using a standard horizontal scanning pattern). Each of the cells is identified according to a unique identifier 722. The table also includes latitude data 724 and longitude data 726 for each of the cells that may be determined based on the weather radar scan of the cell (e.g., horizontal scan). The table also includes range data 728 and bearing data 730 representing an approximate range and bearing, respectively, from the current position of the aircraft to the respective weather cell. In some embodiments, the range and bearing data may be dynamically updated to account for aircraft movement. In some embodiments, image 720 may include one or more user controls that may be manipulated by a user via a user input device (e.g., trackball, touchscreen, bezel keys, etc.) to perform certain actions.

Figure 7C:
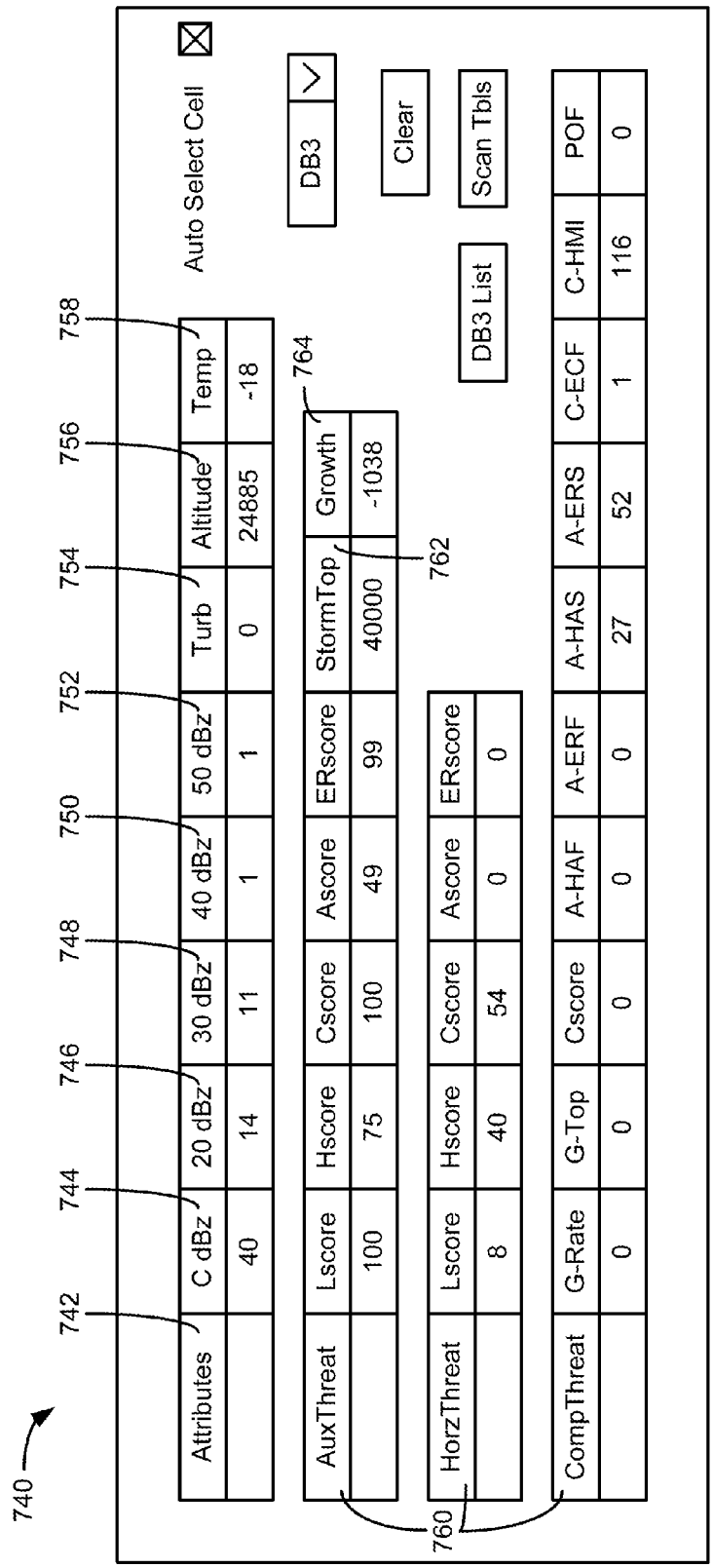
FIG. 7C is a schematic illustration of a display image that may be used to provide detailed information about a particular weather cell according to an exemplary embodiment.

Referring now to FIG. 7C, a schematic illustration of a display image 740 that may be used to provide detailed information about a particular weather cell is shown according to an exemplary embodiment. Display image 740 may be configured to provide information about one particular weather cell, such as the weather cell labeled with the identifier 146 in FIGS. 5 through 7B. Various data provided in display image 740 may provide the pilot with information regarding the severity of the particular weather cell. For example, image 740 may display one or more attributes 742 associated with the weather cell. Some attributes may relate to the reflectivity measured using the radar beams used to scan the cell, which can provide an indication of the severity of the risk associated with the weather cell. Indicators for turbulence, storm top altitude, and cell growth rate are examples of threat data that may be computed by weather hazard algorithms that may also help to indicate the severity of the cell being tracked.

Figure 7D:
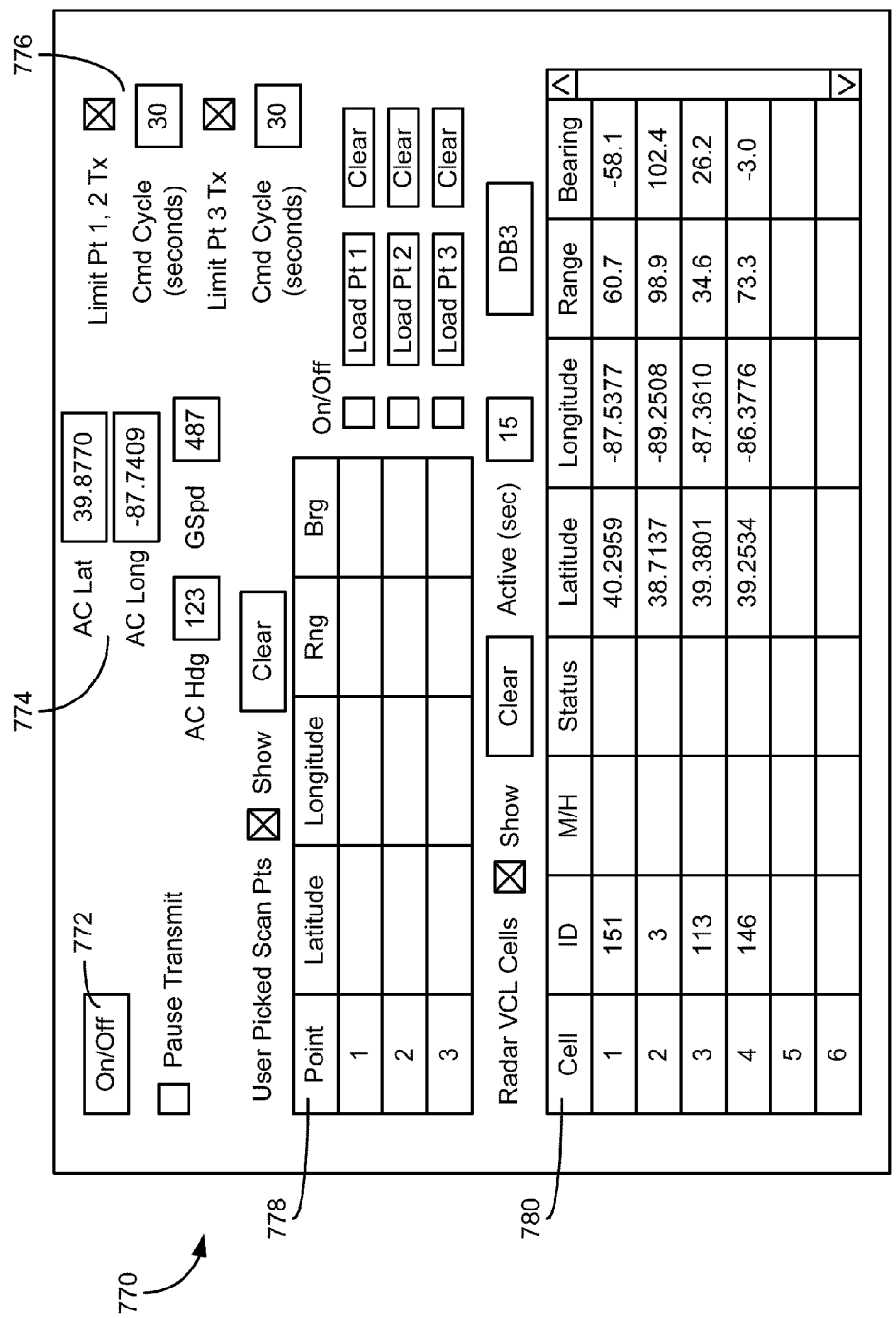
FIG. 7D is a schematic illustration of a user interface display image that may be used to display scan status information and receive user input regarding parameters of radar scanning processes according to an exemplary embodiment.

Referring now to FIG. 7D, a schematic illustration of a user interface display image 770 that may be used to display scan status information and receive user input regarding parameters of radar scanning processes is shown according to an exemplary embodiment. In some embodiments, image 770 may include a user-selected cells table 778 configured to provide information about cells that have been selected to be scanned by a user (e.g., using a user input device such as a touchscreen). Table 778 may include various information relating to the cells that have been manually selected for scanning, such as the latitude and longitude of the cells (e.g., the centroid of the cells), the range and bearing from the aircraft to the cells, etc. In some embodiments, this information may be obtained from a memory prior to the detailed scan of the cells being performed and/or may be based on one or more standard (e.g., horizontal) scans performed by the weather radar system. In some embodiments, image 770 may include transmission controls 776 that a user may use to limit the timing of scan commands transmitted to the radar system for the manually selected cells.

In some embodiments, image 770 may include a scanned cells table 780 that lists tracked cells that have been subjected to a scanning process (e.g., an advanced or auxiliary scanning process). In some embodiments, scanned cells table 780 may include tracked cells that have been automatically and/or manually selected for scanning Table 780 may list various information about the cells, such as a cell identifier, latitude and longitude, range and bearing, and/or other types of information. Cells may appear in table 780 during and/or after a scanning process has been performed on the cells. In some embodiments, cells may be removed from the table after a certain amount of time has elapsed. The time may be a static value stored in a memory, dynamically determined by the processing circuit based on weather and/or flight conditions, manually provided by the user, and/or determined by some other method.

Figure 8:
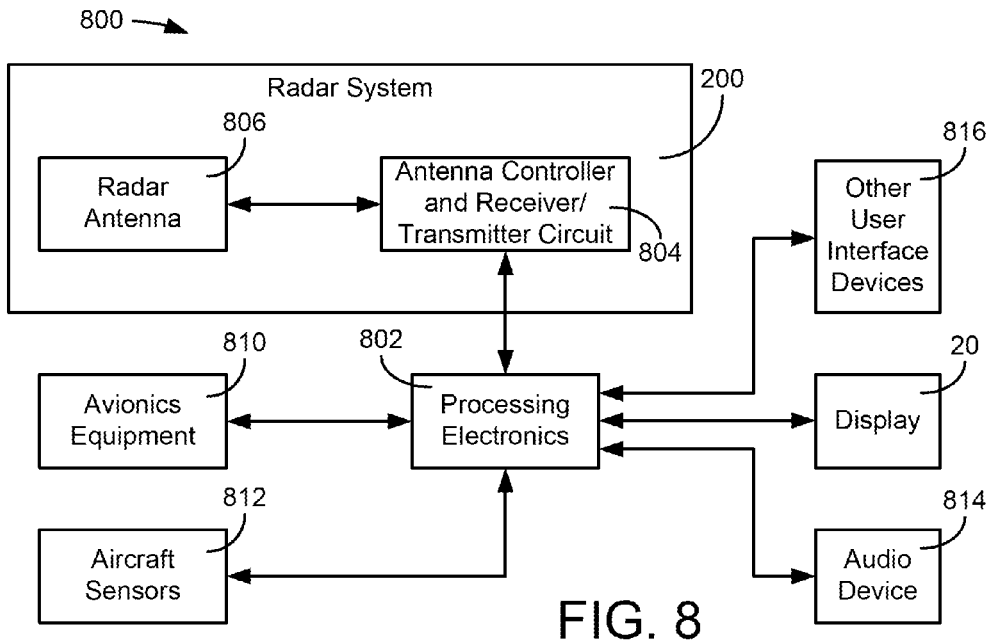
FIG. 8 is a general block diagram of a system for providing weather radar data according to an exemplary embodiment.

Referring now to FIG. 8, a block diagram of a radar control system 800 including a weather radar system 200 is shown according to an exemplary embodiment. Radar system 200 is installed on the aircraft (e.g., in nose 100 of the aircraft or another location) and may be used by the various detection systems of the aircraft to detect hazardous conditions. For example, radar system 200 may be used by a weather detection system to detect the presence of weather, a PWS system to detect a windshear condition, or by other radar detection systems of the aircraft.

Radar system 200 is shown to include a radar antenna 806 connected (e.g., directly or indirectly) to an antenna controller and receiver/transmitter circuit 804. Antenna controller and receiver/transmitter circuit 804 may include any number of mechanical or electrical circuitry components or modules for steering a radar beam generated by radar antenna 806. For example, circuit 804 may be configured to mechanically tilt radar antenna 806 in a first direction while mechanically rotating radar antenna 806 in a second direction. In other embodiments, a radar beam may be electronically swept along a first axis and mechanically swept along a second axis. In yet other embodiments, the radar beam may be entirely electronically steered (e.g., by electronically adjusting the phase of signals provided from adjacent apertures in radar antenna 806, etc.). Circuit 804 may be configured to conduct the actual signal generation that results in a radar beam being provided from radar antenna 806 and to conduct the reception of returns received at radar antenna 806.

Radar return data is provided from circuit 804 to processing electronics 802 for data processing. For example, processing electronics 802 may use the radar return data to determine if a hazardous condition has been detected or is likely to exist. Processing electronics 802 may also be configured to provide control signals or control logic to circuit 804. For example, depending on various inputs, processing electronics 802 may be configured to cause circuit 804 to change behavior or radar beam patterns. In other words, processing electronics 802 may include the processing logic for operating radar system 200.

Processing electronics 802 are further shown in communication with aircraft sensors 812. In general, sensors 812 may be any number of sensors that measure aircraft parameters related to the state of the aircraft. For example, sensors 812 may include temperature sensors, humidity sensors, infrared sensors, altitude sensors, pressure sensors, fuel gauges, airspeed sensors, throttle position sensors, ground speed sensors, pitot-static tubes, a gyroscope, a global positioning system (GPS), or any other aircraft-mounted sensors that may be used to provide data to processing electronics 802. It should be appreciated that sensors 812 (or any other component shown connected to processing electronics 802) may be indirectly or directly connected to the processing electronics 802. For example, processing electronics 802 may receive a temperature reading from a temperature sensor via a direct connection and a throttle position received indirectly from a position sensor via an engine controller.

Processing electronics 802 are further shown in communication with avionics equipment 810. In general, avionics equipment 810 may include other electronic control systems in the aircraft. For example, avionics equipment 810 may include a flight management system, a navigation system, a backup navigation system, or another aircraft system configured to provide inputs to processing electronics 802. For example, avionics equipment 810 may include the landing gear system of the aircraft and provide information such as whether or not the landing gear is deployed, a weight on wheels determination, or other parameters to processing electronics 802. In another example, avionics equipment 810 may provide controls inputs, such as a desired throttle or power level to processing electronics 802.

Processing electronics 802 are additionally shown in communication with display 20 (e.g., via an ARINC 453, ARINC 661, or other type of display bus), audio device 814, and other user interface devices 816 (e.g., an electronic device that receives input from a user or conveys information to a user). For example, processing electronics 802 may provide information about detected weather or other radar-related information to display 20. In some cases, processing electronics 802 may also receive input from display 20, audio device 814, or other user interface devices 816. For example, processing electronics 802 may receive a request for a different radar view or an updated trajectory via display 20 or via a dial in other user interface devices 816.

Processing electronics 802 may be configured to transmit radar scan status data to display 20. For example, processing electronics 802 may be configured to transmit radar data to display 20, and display 20 may be configured to display the radar data on a display screen (e.g., a plan view display, detailed vertical display, etc.). Processing electronics 802 may be configured to transmit radar scan status data to display 20, and display 20 may be configured to display one or more indicators or icons in the display image to indicate the radar scanning status of various weather cells illustrated in the display image.

The motion of the aircraft may be determined by processing electronics 802 based on data received from aircraft sensors 812 (e.g., GPS data, compass data, etc.), avionics equipment 810 (e.g., throttle information, velocity information, etc.), or from radar returns relative to a known location (e.g., a landmark, a reference location, etc.). The data may be indirectly or directly indicative of the speed and direction of the aircraft. For example, processing electronics 802 may directly receive speed and direction data from avionics equipment 810. In another example, processing electronics may determine the speed and direction of the aircraft by comparing GPS locations.

Processing electronics 802 may determine the motion of detected weather using data received from aircraft sensors 812 (e.g., GPS data, compass data, etc.), avionics equipment 810 (e.g., throttle information, velocity information, etc.), or from radar returns. For example, processing electronics 802 may maintain a history of detected weather and compare the data over time to determine the speed, direction, and range of the detected weather. In another example, processing electronics 802 may estimate the speed and direction of the weather using data received from a radar system located remotely from the aircraft. In some embodiments, processing electronics 802 may also identify and track a centroid of the weather, in order to determine the motion of the detected weather.

Figure 9:
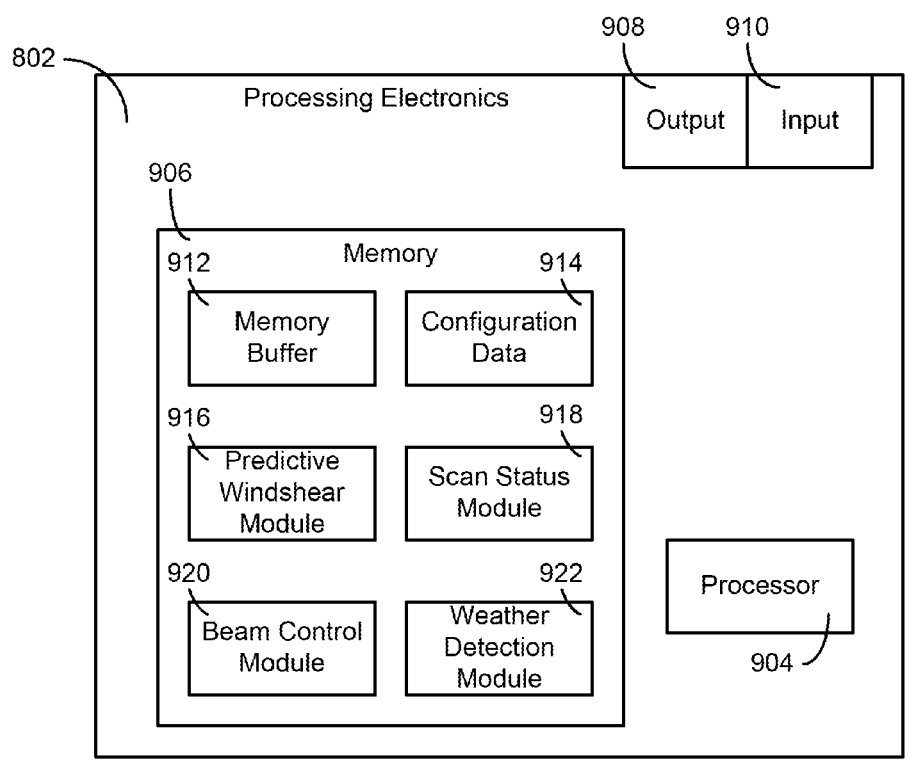
FIG. 9 is a more detailed block diagram of the processing circuit shown in FIG. 8 according to an exemplary embodiment.

Referring now to FIG. 9, a detailed block diagram of processing electronics 802 of FIG. 8 is shown, according to an exemplary embodiment. Processing electronics 802 includes a memory 906 and processor 904. Processor 904 may be or include one or more microprocessors, an application specific integrated circuit (ASIC), a circuit containing one or more processing components, a group of distributed processing components, circuitry for supporting a microprocessor, or other hardware configured for processing. According to an exemplary embodiment, processor 904 is configured to execute computer code stored in memory 906 to complete and facilitate the activities described herein. Memory 906 can be any volatile or non-volatile computer-readable medium capable of storing data or computer code relating to the activities described herein. For example, memory 906 is shown to include modules 916-922 which are computer code modules (e.g., executable code, object code, source code, script code, machine code, etc.) configured for execution by processor 904. When executed by processor 904, processing electronics 802 is configured to complete the activities described herein. Processing electronics includes hardware circuitry for supporting the execution of the computer code of modules 916-922. For example, processing electronics 802 includes hardware interfaces (e.g., output 908) for communicating control signals (e.g., analog, digital) from processing electronics 802 to circuit 804 and to provide signals to other devices such as display 20, audio devices 814, and other user interface devices 816. Processing electronics 802 may also include an input 910 for receiving, for example, radar return data from circuit 804, feedback signals from circuit 804, or for receiving data from user interface devices (e.g., display 20, other user interface devices 816, etc.) or other systems (e.g., aircraft sensors 812, avionics equipment 810, etc.).

Memory 906 includes a memory buffer 912 for receiving and storing radar return data and other data. For example, a forward looking terrain alerting algorithm, an object detection module, predictive windshear module 916, weather detection module 922, or another process that utilizes radar return data may access buffer 912. The radar return data stored in memory 906 may be stored according to a variety of schemes or formats. For example, the radar return data may be stored in an x,y or x,y,z format, a heading-up format, a north-up format, a latitude-longitude format, or any other suitable format for storing spatial-relative information. Memory buffer 912 may also store airplane parameters related to the operational state of the aircraft received from aircraft sensors 812 or avionics equipment 810.

Memory 906 further includes configuration data 914. Configuration data 914 may include data relating to radar system 200 that is used to affect the operation of radar system 200. For example, configuration data 914 may include beam pattern data which may be data that beam control module 920 can interpret to determine how to command circuit 402 to sweep a radar beam. For example, configuration data 914 may include information regarding maximum and minimum azimuth angles of horizontal radar beam sweeps, timing information, speed of movement information, and the like. In some embodiments, configuration data 914 may also be configured to store one or more identifiers for weather cells that have been selected to be tracked (e.g., automatically or by a user).

Memory 906 is also shown to include weather detection module 922 which includes logic for using radar returns in memory buffer 912 to conduct one or more determinations relating to weather. For example, weather detection module 922 may be configured to determine a gain level or other display setting for display of the radar returns on a weather radar display (e.g., on display 20). Weather detection module 922 may further be configured to distinguish terrain returns from weather returns. Weather detection module 922 may also determine when weather is hazardous, determine characteristics of detected weather, or conduct any other processing steps (e.g., filtering) relative to the radar return data for providing a display or warning in the aircraft.

In some embodiments, weather detection module 922 may also track the centroids or outlines of detected weather. The centroid or weather outline information may be used by weather detection module 922 to determine a characteristic of detected weather. For example, U.S. Pat. No. 7,307,577 to Kronfeld et al. discloses a method of using weather centroid data to determine the maximum height of a detected weather cell or portion thereof, the entirety of which is hereby incorporated by reference.

Weather detection module 922 uses the radar returns in memory buffer 912 to generate one or more views of weather. Weather detection module 922 also provides generated views to one or more electronic displays, such as display 20. For example, radar returns in memory buffer 912 may be used to generate a plan view of weather. In another example, radar returns in memory 912 from a radar sweep may be used to generate a vertical profile view for display 20. Any number of different views may be generated by weather detection module 922 and provided to display 20.

Memory 906 is further shown to include beam control module 920. Beam control module 920 may be an algorithm for commanding circuit 402 to sweep a radar beam. Beam control module 920 may be used, for example, to send one or more analog or digital control signals to circuit 402. The control signals may be, for example, an instruction to move the antenna mechanically, an instruction to conduct an electronic beam sweep in a certain way, an instruction to move the radar beam to the left by five degrees, etc. Beam control module 920 may be configured to control timing of the beam sweeps or movements relative to aircraft speed, flight path information, transmission or reception characteristics from radar system 200 or otherwise. Beam control module 920 may receive data from configuration data 914 for configuring the movement of the radar beam.

In some embodiments, beam control module 920 may also receive a target value for directing radar sweeps. Beam control module 920 uses the target value to control the direction at which radar sweeps are made. For example, a target value from a user interface device (e.g., display 20, other user interface devices 816, etc.) may be used by beam control module 920 to direct radar antenna 806 in a specified direction. Beam control module 920 may also use adjusted target values (e.g., from target value adjustment module 918) to reposition the direction of radar antenna 806.

Memory 906 further includes a predictive windshear module 916 which includes logic for using radar returns in memory buffer 912 to detect the presence or absence of microbursts or windshear. Predictive windshear module 916 may include or be coupled to a weather database or other memory including weather data such as microburst downflow models. Predictive windshear module 916 may be configured to use radar return information or information derived by radar return information with weather data stored in a weather database or other memory.

Predictive windshear module 916 may also be configured to automatically activate radar system 200, based on the operational state determined by aircraft status module 918 (e.g., during takeoff, during landing, etc.). For example, predictive windshear module 916 may automatically activate radar antenna 806 during a landing when the aircraft reaches a given altitude threshold. In another example, predictive windshear module 916 may automatically activate radar system 200 during takeoff, provided certain aircraft conditions or qualifiers are met. For example, predictive windshear module 916 may determine that the aircraft is about to take off based on a weight on wheels determination, the engine throttle, the velocity of the aircraft, or any other aircraft parameter associated with takeoffs.

Memory 906 may also include scan status module 918. Scan status module 918 is configured to determine a scan status for one or more weather cells and to transmit data regarding the scan status of the weather cells to display 20. After receiving the scan status data, display 20 is configured to display one or more indicators or icons (e.g., overlaid on a standard radar display image) indicating the scan status of the weather cells to the pilot. For example, a first icon may indicate that an associated weather cell is currently being scanned by radar system 200. Another icon may indicate that associated weather cells have previously been scanned by radar system 200. Yet another icon may indicate that previously obtained radar data for associated cells has become old or expired. Another icon may indicate that a weather cell has been selected for scanning by radar system 200 but has not yet been scanned. Still further icons may indicate whether a weather cell was selected for tracking automatically (e.g., according to a hazard assessment algorithm) or manually (e.g., by a user using a user input device). According to various embodiments, other types of indicators may be used to indicate various other status states for the radar data.

Figures 10, 11:
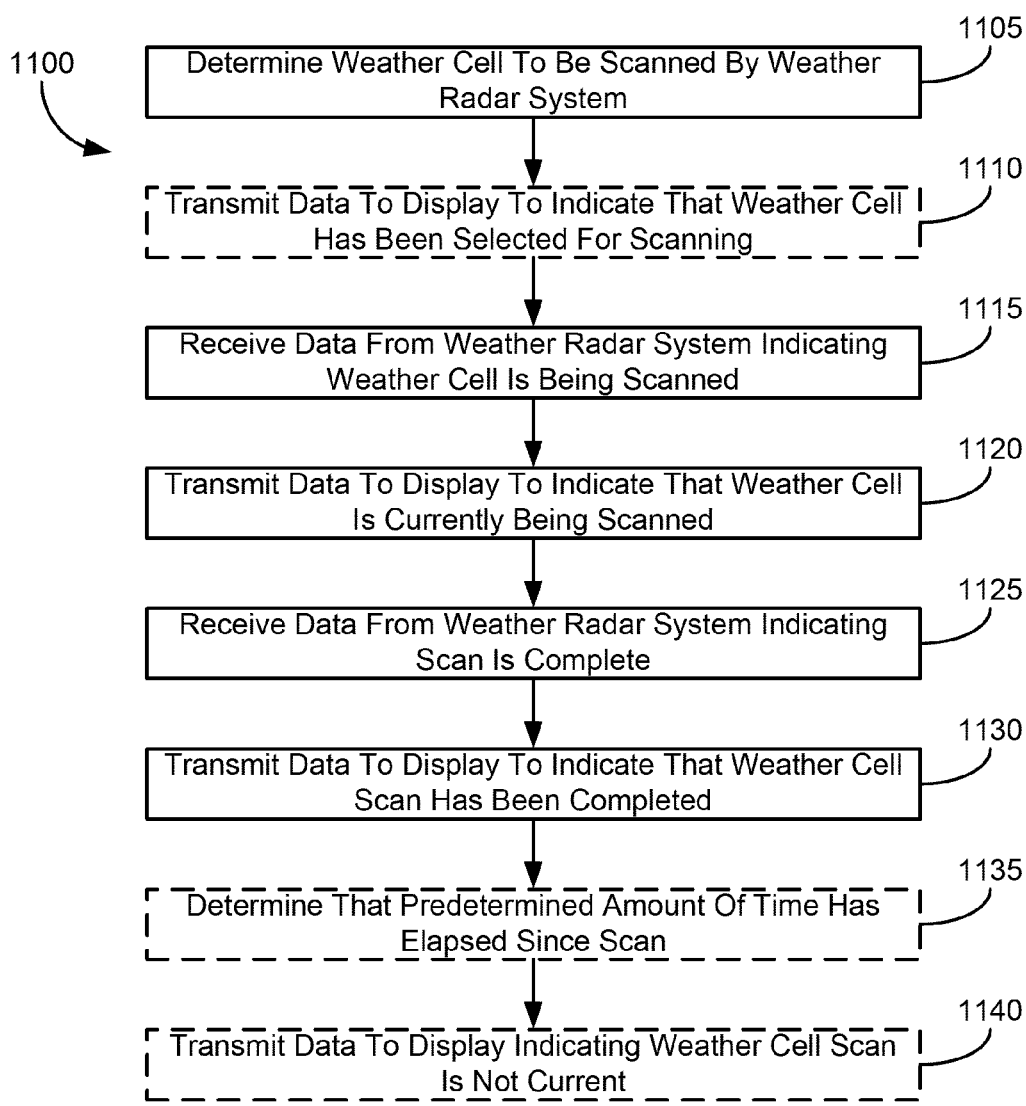
FIG. 10 is a flow diagram of a process for providing weather radar status data according to an exemplary embodiment.
FIG. 11 is a flow diagram of a process for providing weather radar status data according to another exemplary embodiment.

Referring now to FIG. 10, a flow diagram of a process 1000 for providing radar scan status data is shown according to an exemplary embodiment. In some embodiments, process 1000 may be implemented using instructions stored on a computer-readable medium (e.g., memory 906) that are executable by a processor (e.g., processor 904).

At step 1005, data may be received at a processing circuit from a weather radar system indicating a weather cell that is currently being scanned. In some embodiments, the processing circuit may be configured to control the operation of the weather radar system, and receiving data from the weather radar system may not be necessary to determine a scanning status of the system (e.g., it may be stored in a memory, or the processing circuit may be aware of the status from the commands it has transmitted to the radar system). In another embodiment, system 800 may provide data indicating location or antenna control values (e.g., tilt, azimuth angle, etc.) regarding where the radar is scanning Processor 802 may use this information to determine what cells are being scanned.

At step 1010, data may be transmitted from the processing circuit to a display device, and the display device may be configured to display radar data in response to receiving the data from the processing circuit. The data transmitted by the processing circuit may include scan status data identifying a weather cell that is currently being scanned. The display device may be configured to display an indicator or icon in a display image (e.g., overlaid on the standard radar image) identifying the weather cell that is currently being scanned. For example, in some embodiments, the processing circuit may be configured to generate a standard weather radar display image illustrating various weather cells and/or hazards in the area of the aircraft and then insert one or more indicators or icons over the image at positions corresponding to one or more portions of weather cells for which status indicators are being provided.

Referring now to FIG. 11, a flow diagram of another process 1100 for providing radar scan status data is shown according to an exemplary embodiment. In some embodiments, process 1000 may be implemented using instructions stored on a computer-readable medium (e.g., memory 906) that are executable by a processor (e.g., processor 904).

At step 1105, a processing circuit may be configured to determine one or more weather cells to be tracked or scanned by a weather radar system. The processing circuit may be configured to determine weather cells to be tracked automatically (e.g., based on a hazard assessment algorithm) or manually based on user input (e.g., via user selection of one or more cells displayed in a radar display image).

At step 1110, in some embodiments, the processing circuit may be configured to transmit data to the display device indicating the one or more weather cells that have been selected for scanning. The display device may be configured to display indicators or icons that inform the pilot which cells have been selected to be scanned. In some embodiments, the pilot may be enabled to alter the selection of cells to be scanned using a user input device, such as a touchscreen display, bezel keys, etc.

At step 1115, the processing circuit data may be received at a processing circuit from a weather radar system indicating a weather cell that is currently being scanned. At step 1120, data may be transmitted from the processing circuit to a display device, and the display device may be configured to display radar data in response to receiving the data from the processing circuit. The data transmitted by the processing circuit may include scan status data identifying a weather cell that is currently being scanned. The display device may be configured to display an indicator or icon in a display image (e.g., overlaid on the standard radar image) identifying the weather cell that is currently being scanned. In some embodiments, if multiple cells have been identified to be tracked, the type of icon used to indicate active scanning of a cell may be moved from cell to cell as the cells are being actively (e.g., currently) scanned by the weather radar system.

At step 1120, the processing circuit may receive data from the weather radar system indicating that the scan of a particular weather cell has been completed. At step 1125, the processing circuit may transmit scan status data to the display indicating the weather cell for which the scanning process has been completed and/or a new weather cell that is being scanned. The display device may be configured to display an indicator or icon in the display image indicating that the scan of the weather cell has been completed. The display device may provide an indicator for the new weather cell showing that the new cell is currently being scanned. In some embodiments, the processing circuit may be configured to transmit scan status data to the display that causes the display to show multiple cells for which advanced radar scans have been completed (e.g., recently).

Weather patterns may change as time passes, and, in some embodiments, the processing circuit may be configured to provide an indication when scans may no longer be current or safe to rely upon. At step 1135, the processing circuit may be configured to determine that a predetermined amount of time has elapsed since the scan of a particular weather cell was completed. In some embodiments, the predetermined amount of time may be a static value or values stored in a memory. In other embodiments, the amount of time may be determined dynamically (e.g., based upon the severity of the weather cell).

At step 1140, the processing circuit may be configured to transmit data to the display device indicating that the scan data for a particular cell may no longer be current (e.g., is expired). The display device may be configured to display an altered image that indicates to the pilot that the scan data is no longer current for the particular cell. In some embodiments, a different indicator may be provided for the cell indicating that the cell was previously subjected to an advanced scan but that the data is old. In other embodiments, the icon indicating that cell had been scanned may be removed from the display image (e.g., such that the cell appears in a similar or the same manner as a cell that had not been scanned).

Unless otherwise specified, numerical descriptions associated with terms such as indicators (e.g., first indicator, second indicator, third indicator, fourth indicator, etc.) should not be interpreted as implying an order in which items are provided, presented, or displayed. While, in some embodiments, indicators may be displayed according to the numerical order of their associated descriptions (i.e., a first indicator may be displayed first, a second indicator may be displayed second, etc.), this may not be the case for other exemplary embodiments. Numerical descriptions are often provided in the present disclosure to differentiate between types of indicators (e.g., a first indicator may be of a different type than a second indicator). For example, in various embodiments, a first indicator may be displayed before a second indicator and a third indicator, before the third indicator but after the second indicator, after both the second and third indicators, after the third indicator and before the second indicator, etc. Further, in some embodiments, the first indicator may be displayed after one or more other indicators (e.g., the second or third indicators); the term "first" is not intended to imply that the first indicator is displayed before all other indicators. In various embodiments, indicators may be provided, presented, or displayed in any order or arrangement.

Various exemplary systems and method described herein provide weather radar system status information to users so that the users have greater awareness of the operation of the weather radar system, such as whether a particular cell is currently being scanned, has recently been scanned, has been selected to be scanned, etc. Further, various exemplary embodiments described herein allow a pilot to judge latency or responsiveness of the system to weather events through use of the more detailed radar scan status information. Further still, various exemplary embodiments described herein provide a pilot with an indication that an operation is being performed by the weather radar system (e.g., an advanced or non-standard scanning operation) and reassure the pilot that the system has not malfunctioned. For example, by providing an icon on a display indicating that a cell is currently being subjected to a detailed weather radar scan, the pilot knows that the weather radar system is simply busy performing the detailed scan of the particular cell and has not malfunctioned or locked up onto a particular display screen.

The disclosure is described above with reference to drawings. These drawings illustrate certain details of specific embodiments that implement the systems and methods and programs of the present disclosure. However, describing the disclosure with drawings should not be construed as imposing on the disclosure any limitations that may be present in the drawings. The present disclosure contemplates methods, systems and program products on any machine-readable media for accomplishing its operations. The embodiments of the present disclosure may be implemented using an existing computer processor, or by a special purpose computer processor incorporated for this or another purpose or by a hard-wired system. No claim element herein is to be construed under the provisions of 35 U.S.C. §112, sixth paragraph, unless the element is expressly recited using the phrase "means for." Furthermore, no element, component or method step in the present disclosure is intended to be dedicated to the public, regardless of whether the element, component or method step is explicitly recited in the claims.

As noted above, embodiments within the scope of the present disclosure include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD ROM or other optical disk storage, magnetic disk storage or other magnetic storage devices, or any other medium (e.g., non-transitory medium) which can be used to carry or store desired program code in the form of machine-executable instructions or data structures and which can be accessed by a general purpose or special purpose computer or other machine with a processor. Combinations of the above are also included within the scope of machine-readable media. Machine-executable instructions comprise, for example, instructions and data which cause a general purpose computer, special purpose computer, or special purpose processing machine to perform a certain function or group of functions.

Embodiments of the disclosure are described in the general context of method steps which may be implemented in one embodiment by a program product including machine-executable instructions, such as program code, for example, in the form of program modules executed by machines in networked environments. Generally, program modules include routines, programs, objects, components, data structures, etc., that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

An exemplary system for implementing the overall system or portions of the disclosure might include a general purpose computing device in the form of a computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules, and other data for the computer.

It should be noted that although the flowcharts provided herein show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the disclosure have been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated.

What is claimed is:

1. A method of providing weather data generated by a weather radar system of an aircraft, the method comprising:
   providing scan status data indicating that a weather cell is currently being scanned by the weather radar system to a display device,
   wherein the display device is configured to display an indication that the weather cell is currently being scanned after receiving the scan status data,
   providing second scan status data indicating that a second weather cell was previously scanned by the weather radar system, wherein the display device is configured to display an indication that the second weather cell was previously scanned after receiving the second scan status data, and
   providing third scan status data after a predetermined time period from a time at which the second weather cell was scanned by the weather radar system has elapsed, wherein the display device is configured to remove the indication that the second weather cell was previously scanned after receiving the third scan status data.

2. A method of providing weather data generated by a weather radar system of an aircraft, the method comprising:
   providing scan status data indicating that a weather cell is currently being scanned by the weather radar system to a display device,
   wherein the display device is configured to display an indication that the weather cell is currently being scanned after receiving the scan status data, wherein the display device is configured to display a first indicator associated with the weather cell after receiving the scan status data indicating that the weather cell is currently being scanned by the weather radar system, and wherein the method further comprises providing scan status data configured to cause the display device to display:
   a second indicator associated with the weather cell after the weather cell has been selected to be scanned using the weather radar system, and
   a third indicator associated with the weather cell after the weather radar system has finished scanning the weather cell.

3. The method of claim 2, further comprising providing second scan status data indicating that a second weather cell was previously scanned by the weather radar system, wherein the display device is configured to display an indication that the second weather cell was previously scanned after receiving the second scan status data.

4. The method of claim 1, further comprising providing weather data comprising information regarding one or more characteristics of the second weather cell to the display device, wherein the display device is configured to display the information regarding the one or more characteristics of the second weather cell after receiving the weather data.

5. The method of claim 4, wherein the display device is configured to display the information regarding the one or more characteristics of the second weather cell based on a selection of the second weather cell received from a user input device.

6. The method of claim 3, further comprising providing third scan status data after a predetermined time period from a time at which the second weather cell was scanned by the weather radar system has elapsed, wherein the display device is configured to remove the indication that the second weather cell was previously scanned after receiving the third scan status data.

7. The method of claim 1, wherein the weather cell is a first weather cell of a plurality of weather cells, and wherein the method further comprises selecting the first weather cell to scan using the weather radar system without receiving a manual selection of the first weather cell from a user.

8. The method of claim 1, wherein the weather cell is a first weather cell of a plurality of weather cells, and wherein the method further comprises selecting the first weather cell to scan using the weather radar system based on input received from a user input device.

9. The method of claim 8, wherein the input represents a user selection of a portion of the first weather cell displayed on the display device.

10. The method of claim 2, wherein the second indicator comprises different indicators based on whether the weather cell is selected to be scanned with or without receiving input from a user input device.

11. A system comprising:
   a processing circuit configured to provide first scan status data or a first scan status signal indicating that a weather cell is currently being scanned by the weather radar system to a display device, wherein the display device displays an indication that the weather cell is currently being scanned after the processing circuit provides the first scan status data or first scan status signal, wherein the processing circuit is configured to provide second scan status data or a second scan status signal to the display device indicating that a second weather cell was previously scanned by the weather radar system, wherein the display device displays an indication that the second weather cell was previously scanned the processing circuit provides the second scan status data or the second scan status signal, wherein the processing circuit is configured to provide third scan status data or a third scan status signal after a predetermined time period from a time at which the second weather cell was scanned by the weather radar system has elapsed, wherein the display device removes the indication that the second weather cell was previously scanned after the processing circuit provides the third scan status data or the third scan status signal.

12. A system comprising:
a processing circuit configured to provide scan status data or a scan status signal indicating that a weather cell is currently being scanned by the weather radar system to a display device and configured to cause the display the display device to display a first indicator associated with the weather cell indicating that the weather cell is currently being scanned by the weather radar system, and wherein the processing circuit is further configured to provide the scan status data or the scan status signal configured to cause the display device to display:
   a second indicator associated with the weather cell after the weather cell has been selected to be scanned using the weather radar system, and
   a third indicator associated with the weather cell after the weather radar system has finished scanning the weather cell.

13. The system of claim 12, wherein the processing circuit is configured to provide second scan status data or a second scan status signal to the display device indicating that a second weather cell was previously scanned by the weather radar system, wherein the display device is configured to display an indication that the second weather cell was previously scanned after receiving the second scan status data or the second scan status signal.

14. The system of claim 13, wherein the processing circuit is configured to provide third scan status data or a third scan status signal after a predetermined time period from a time at which the second weather cell was scanned by the weather radar system has elapsed, wherein the display device is configured to remove the indication that the second weather cell was previously scanned after receiving the third scan status data or the third scan status signal.

15. The system of claim 12, wherein the second indicator comprises different indicators based on whether the first weather cell is selected to be scanned with or without receiving input from a user input device.

16. The system of claim 11, further comprising the display device, the display device being configured to display an indication that the weather cell is currently being scanned after receiving the scan status data.

17. A computer-readable medium having instructions stored thereon, the instructions being executable by a processor to implement a method comprising:
   transmitting first scan status data indicating that a weather cell is currently being scanned by the weather radar system for displaying a first indication that the weather cell is currently being scanned;
   transmitting second scan status data after the weather radar system has finished scanning the weather cell for displaying a second indication that the scan of the weather cell has been completed; and
   transmitting third scan status data after a predetermined time period from a time at which the scan of the weather cell was completed has elapsed for removing the second indication.

18. A computer-readable medium having instructions stored thereon, the instructions being executable by a processor method comprising:
   transmitting first scan status data indicating that a weather cell is currently being scanned by the weather radar system to a display device, wherein the display device displays a first indication that the weather cell is currently being scanned after receiving the first scan status data; and
   transmitting second scan status data after the weather radar system has finished scanning the weather cell, wherein the display device displays a second indication that the scan of the weather cell has been completed after receiving the second scan status data, and wherein the method further comprises transmitting third scan status data configured to cause the display device to display:
   a third indication associated with the weather cell after the weather cell has been selected to be scanned using the weather radar system.

19. The computer-readable medium of claim 18, wherein the method further comprises transmitting third scan status data after a predetermined time period from a time at which the scan of the weather cell was completed has elapsed, wherein the display device is configured to remove the second indication from the display after receiving the third scan status data.

20. The computer-readable medium of claim 18, wherein the third indication comprises different indicators based on whether the weather cell is selected to be scanned with or without receiving input from a user input device.

* * * * *